(Model.)
G. PETERSON.
MINER'S CANDLESTICK.
No. 417,882. Patented Dec. 24, 1889.
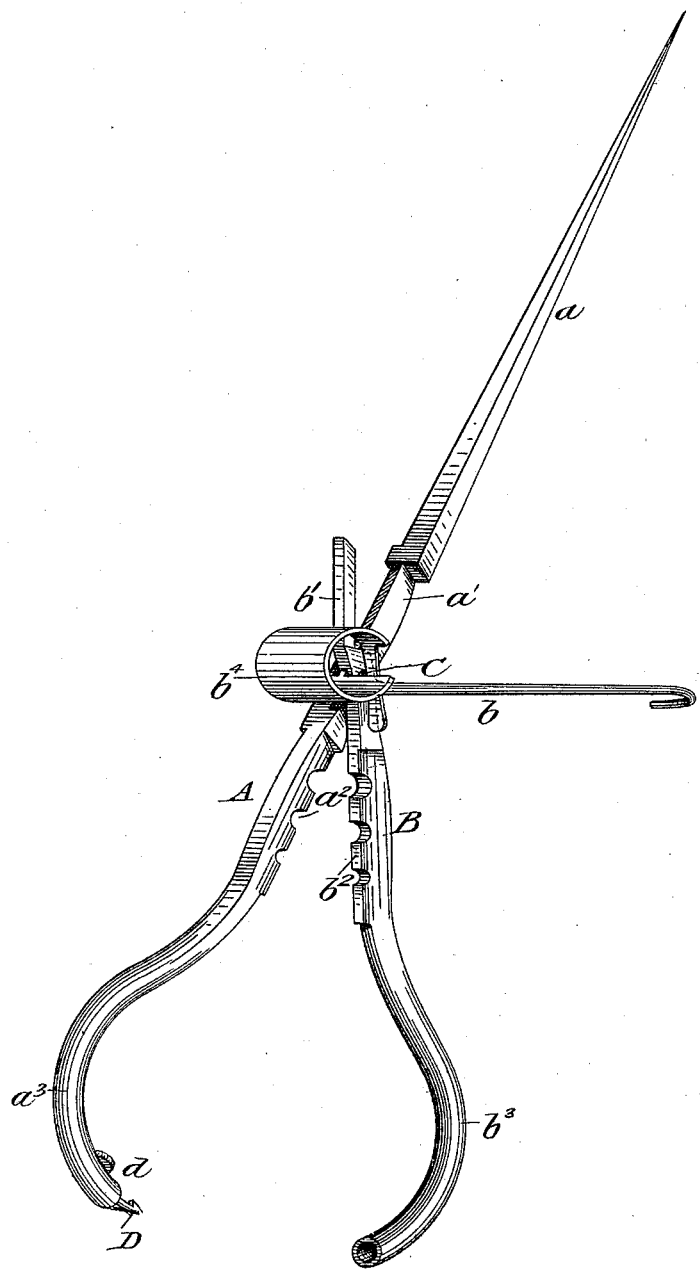
Witnesses,
Geo. H. Strong.
J. H. Kruse
Inventor,
Gustavus Peterson
By Dewey & Co.
Attys

UNITED STATES PATENT OFFICE.

UNITED STATES PATENT OFFICE.

GUSTAVUS PETERSON, OF TUSCARORA, NEVADA.

MINER'S CANDLESTICK.

SPECIFICATION forming part of Letters Patent No. 417,882, dated December 24, 1889.

Application filed April 10, 1889. Serial No. 306,729. (Model.)

*To all whom it may concern:*

Be it known that I, GUSTAVUS PETERSON, of Tuscarora, county of Elko, State of Nevada, have invented an Improvement in Miners' Candlesticks; and I hereby declare the following to be a full, clear, and exact description of the same.

My invention relates to that class of miners' candlesticks in which are combined in a single implement a spear or piercing stick or bar, a hanging-up hook, a socket for the candle, a fuse-cutter, and a cap-crimper; and my invention consists in the novel arrangement and construction of these several parts in a single candlestick, as I shall hereinafter fully describe.

The object of my invention is to provide a simple, durable, and effective miner's candlestick.

Referring to the accompanying drawing for a more complete explanation of my invention, the figure is a perspective view of my candlestick. It will be seen that it is formed of two main parts A and B. The part A is made at one end with the spear or piercing point $a$, one half $a'$ of the fuse-cutter, one half $a^2$ of the cap-crimper, and one half $a^3$ of the handle. The part B is made with the other half $b'$ of the fuse-cutter, the other half $b^2$ of the cap-crimper, the other half $b^3$ of the handle, and it has also attached to or formed with it near its pivotal center the hanging-up hook $b$ on one side and a split cylinder forming the spring-socket $b^4$ for the candle on the other side. The two parts A and B are pivoted together at C, so that the fuse-cutter halves, which are sharp blades, act shearwise to cut off the fuse. The spear or piercing point $a$ is made of suitable length, and its object is the same as in other candlesticks of this class—namely, to be driven into a wall or timber to hold the candlestick. The cap-crimper halves consist of semicircular sockets in each part, which, when brought together by the movement of the handle portions, encircle and bind upon the cap, thereby crimping it on the fuse. These crimping-sockets are preferably arranged in series and of different sizes, so as to crimp the different sizes of caps. The handle portions $a^3$ $b^3$ are suitably bent or curved, and their meeting ends may be joined by a spring-clasp D in one end, which may be depressed to release the handle portion by a set-screw $d$ when the fuse-cutter and cap-crimper have to be used.

Having thus described my invention, what I claim as new, and desire to secure by Letters Patent, is—

1. In a miner's candlestick, the combination of the main parts A and B, pivoted together, the former part having one end formed with the spear or piercing point, its other end formed with a handle portion, and its middle with a cutting-blade, and the latter part having one end formed with a cutting-blade and its other end with a handle portion corresponding with the handle portion of the other part, substantially as described.

2. In a miner's candlestick, the combination of the main parts A and B, pivoted together, the former part having one end formed with a spear or piercing point, its other end formed with a handle portion, and its middle formed with a cutting-blade and with semicircular sockets, and the latter part having one end formed with a cutting-blade, its other end formed with a handle portion corresponding with the handle portion of the other part, and its middle with semicircular sockets, substantially as described.

3. In a miner's candlestick, the combination of the part A, having one end formed with a spear or piercing point, its other end with a handle portion, and its middle with a cutting-blade, the part B, pivoted to part A and having one end formed with a cutting-blade and its other end with a handle portion corresponding with the handle portion of the other part, the hanging-up hook, and the candle-socket, substantially as described.

4. In a miner's candlestick, the combination of the part A, having one end formed with a spear or piercing point, its other end with a handle portion, and its middle with a cutting-blade, the part B, pivoted to part A and having one end formed with a cutting-blade and its other end with a handle portion, and the hanging-up hook secured to or formed with the part B on one side of the candle-socket and secured to or formed with said part on the other side, substantially as described.

5. A miner's candlestick composed of the parts A and B pivoted together, the part A being formed at one end with a spear or piercing point, at its other end with a handle portion, and at its middle with a cutting-blade and semicircular sockets, the part B being formed at one end with a cutting-blade, at its other end with a handle portion, and at its middle with semicircular sockets, the hanging-up hook carried by the part B on one side, and the candle-socket carried by said part on the other side, substantially as described.

In witness whereof I have hereunto set my hand.

GUSTAVUS PETERSON.

Witnesses:
WM. I. STRICKLER,
D. B. WILLIAMS.